(12) United States Patent
Tomura

(10) Patent No.: US 11,038,439 B2
(45) Date of Patent: Jun. 15, 2021

(54) VIBRATION-WAVE MOTOR

(71) Applicant: CANON KABUSHIKI KAISHA, Tokyo (JP)

(72) Inventor: Kaori Tomura, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 640 days.

(21) Appl. No.: 15/840,096

(22) Filed: Dec. 13, 2017

(65) Prior Publication Data

US 2018/0175747 A1 Jun. 21, 2018

(30) Foreign Application Priority Data

Dec. 15, 2016 (JP) .............................. JP2016-243180

(51) Int. Cl.
| | | |
|---|---|---|
| *H02N 2/02* | (2006.01) | |
| *H02N 2/08* | (2006.01) | |
| *G02B 7/04* | (2021.01) | |
| *H02N 2/04* | (2006.01) | |
| *H02N 2/00* | (2006.01) | |
| *G02B 7/02* | (2021.01) | |
| *G03B 17/12* | (2021.01) | |

(52) U.S. Cl.
CPC ............... *H02N 2/026* (2013.01); *G02B 7/02* (2013.01); *G02B 7/04* (2013.01); *H02N 2/0025* (2013.01); *H02N 2/0055* (2013.01); *H02N 2/043* (2013.01); *H02N 2/08* (2013.01); *G03B 17/12* (2013.01); *G03B 2205/0061* (2013.01)

(58) Field of Classification Search
CPC combination set(s) only.
See application file for complete search history.

(56) References Cited

U.S. PATENT DOCUMENTS

| | | | |
|---|---|---|---|
| 2011/0037348 A1* | 2/2011 | Sakamoto | ............... F16C 29/04 310/323.02 |
| 2014/0285066 A1* | 9/2014 | Yamamoto | ............. H02N 2/026 310/323.02 |
| 2014/0293463 A1* | 10/2014 | Yamanaka | ............. H02N 2/004 359/824 |
| 2015/0183001 A1* | 7/2015 | Yamamoto | ............ B06B 1/0644 310/334 |

FOREIGN PATENT DOCUMENTS

JP          2015-126692 A          7/2015

* cited by examiner

*Primary Examiner* — Bryan P Gordon
(74) *Attorney, Agent, or Firm* — Cowan, Liebowitz & Latman, P.C.

(57) ABSTRACT

A vibration-wave motor includes a vibrator, a first holding member configured to hold the vibrator, a second holding member configured to hold the first holding member, a plurality of pressing members arranged around the vibrator and configured to press the vibrator against a contacting member that contacts the vibrator, a movable plate disposed opposite to the vibrator with respect to the contacting member, and a coupling part configured to couple the second holding member and the movable plate with each other. The vibrator and the contacting member move relatively to each other due to a vibration generated by the vibrator. One of the second holding member and the movable plate includes a transmitting part configured to transmit a driving force of the vibration-wave motor to a driven member.

19 Claims, 9 Drawing Sheets

VIBRATION-WAVE MOTOR

BACKGROUND OF THE INVENTION

Field of the Invention

The present invention relates to a vibration-wave motor.

Description of the Related Art

A vibration-wave motor (ultrasonic motor) has conventionally been known in which a vibrator and a contacting member move relatively to each other when a high frequency voltage is applied and the periodically vibrating vibrator is pressed against the contacting member. Japanese Patent Laid-Open No. ("JP") 2015-126692 discloses an ultrasonic motor that includes a vibrator that ultrasonically vibrates with an application of a high frequency driving voltage, a contacting member that frictionally contacts the vibrator, and a pressing member that presses the vibrator against the contacting member, wherein the vibrator and the contacting member move relatively to each other due to the ultrasonic vibration.

However, it is difficult to make small the ultrasonic motor disclosed in JP 2015-126692 because the pressing member and the vibrator overlap each other in the pressing direction by the pressing member.

In addition, in an attempt to make small the ultrasonic motor, a movable unit that includes the pressing member and the vibrator may be less rigid. In this case, a relative positional shift (so-called mechanical delay) occurs between the vibrator configured to generate the driving force and a member configured to transmit the driving force to a driven member and the ultrasonic motor cannot stably move the driven member.

SUMMARY OF THE INVENTION

The present invention provides a vibration-wave motor that can be made smaller in a pressing direction to a vibrator and stably transmit a driving force without any mechanical delays.

A vibration-wave motor according to one aspect of the present invention includes a vibrator, a first holding member configured to hold the vibrator, a second holding member configured to hold the first holding member, a plurality of pressing members arranged around the vibrator and configured to press the vibrator against a contacting member that contacts the vibrator, a movable plate disposed opposite to the vibrator with respect to the contacting member, and a coupling part configured to couple the second holding member and the movable plate with each other. The vibrator and the contacting member move relatively to each other due to a vibration generated by the vibrator. One of the second holding member and the movable plate includes a transmitting part configured to transmit a driving force of the vibration-wave motor to a driven member. The coupling part and the transmitting part are provided close to each other in one of areas outside of the vibrator in a direction orthogonal to a pressing direction by the plurality of pressing members when the vibrator is viewed from the pressing direction, and a relative moving direction between the vibrator and the contacting member.

Further features of the present invention will become apparent from the following description of exemplary embodiments with reference to the attached drawings.

DESCRIPTION OF THE EMBODIMENTS

Figure 1:
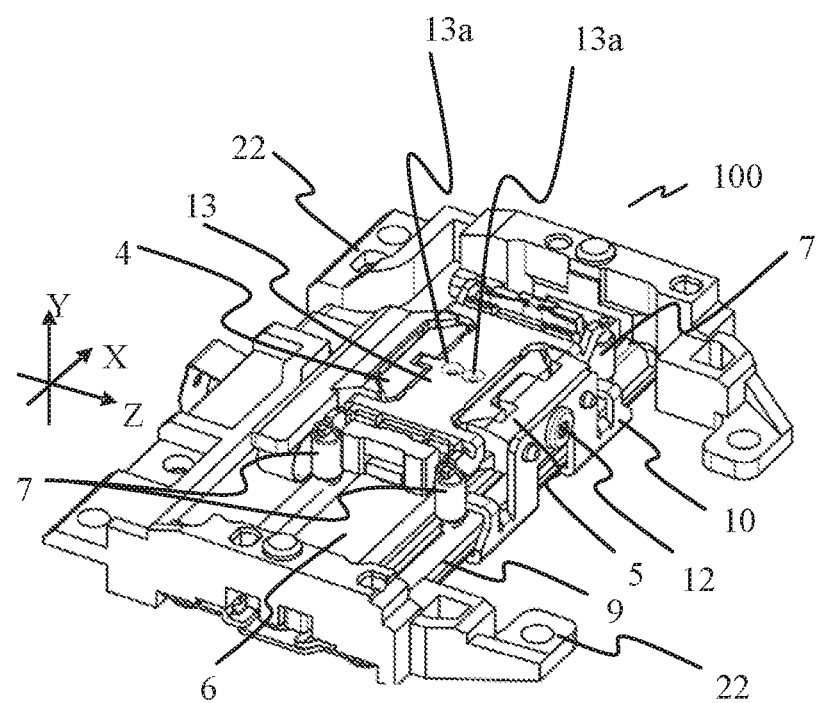
FIG. 1 is a perspective view of a vibration-wave motor according to a first embodiment.

Referring now to the accompanying drawings, a detailed description will be given of embodiments of the present invention. In each embodiment, corresponding elements will be designated by the same reference numerals, and a description will be omitted. In each embodiment, an X-axis direction is a moving direction in which a vibrator and a contacting member move relatively to each other, and a Y-axis direction is a pressing direction orthogonal to the X-axis direction, in which the vibrator is pressed against the contacting member. A Z-axis direction is a direction orthogonal to the X-axis direction and the Y-axis direction. A coordinate system in each embodiment is defined for description convenience, and the present invention is not limited to this embodiment.

First Embodiment

Figure 2A:
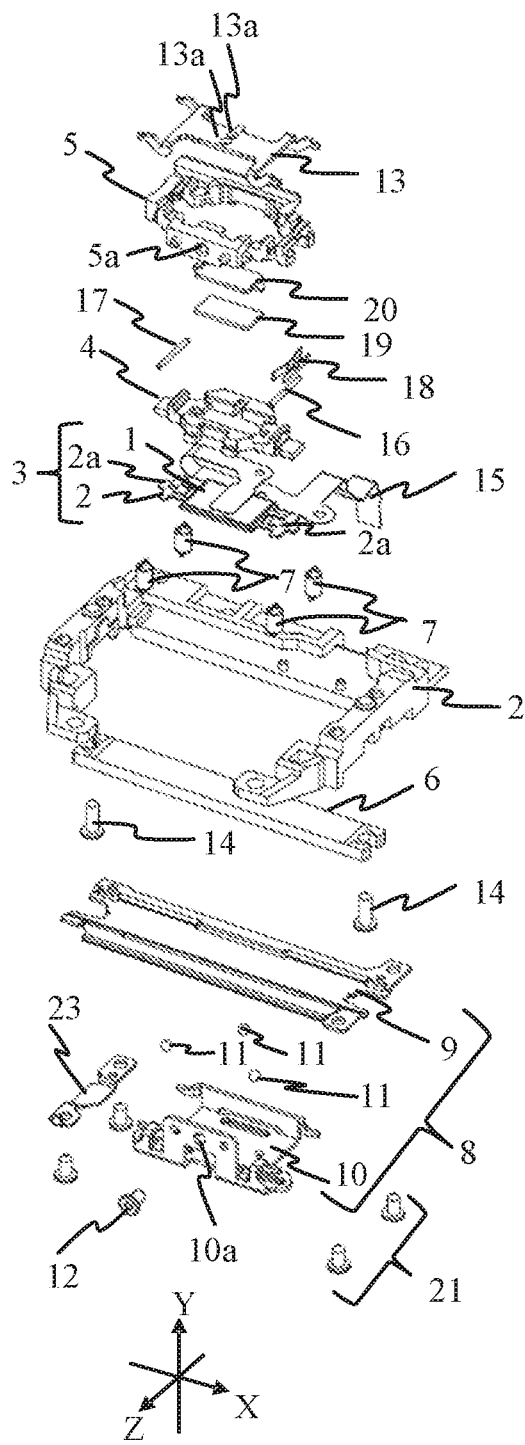
FIGS. 2A and 2B are exploded perspective views of the vibration-wave motor according to the first embodiment.
Figure 2B:
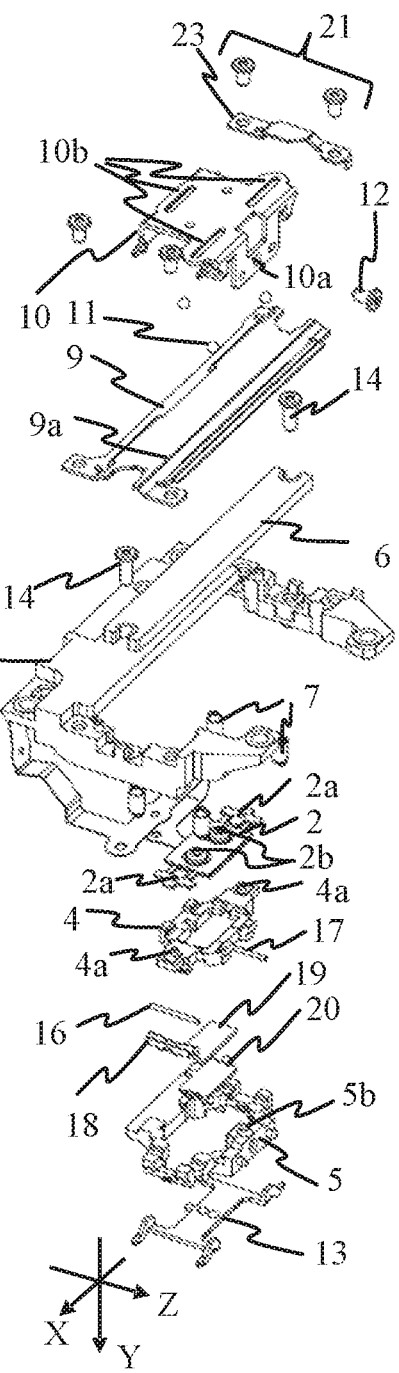
Figure 3:
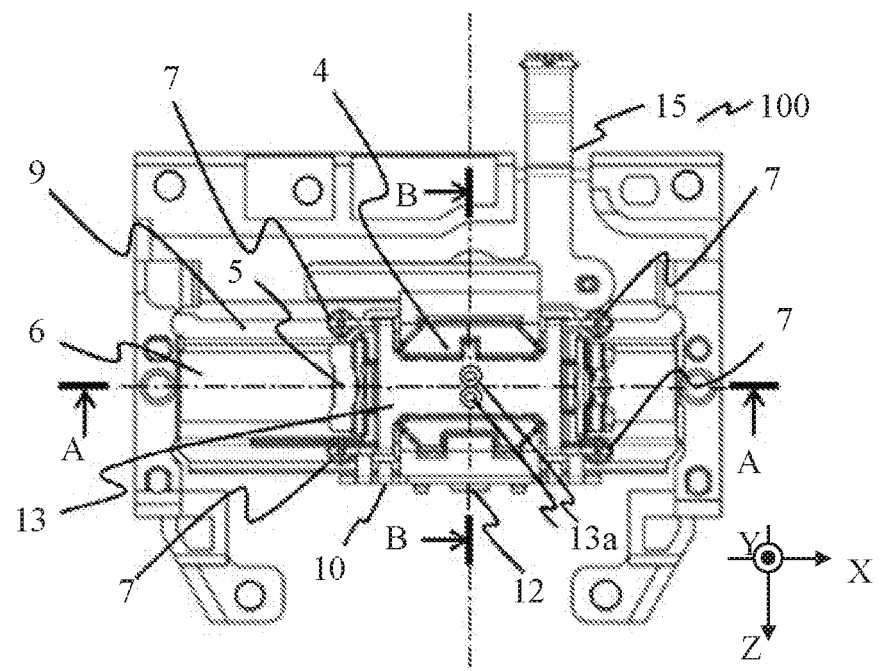
FIG. 3 is a top view of the vibration-wave motor according to the first embodiment.
Figure 4:
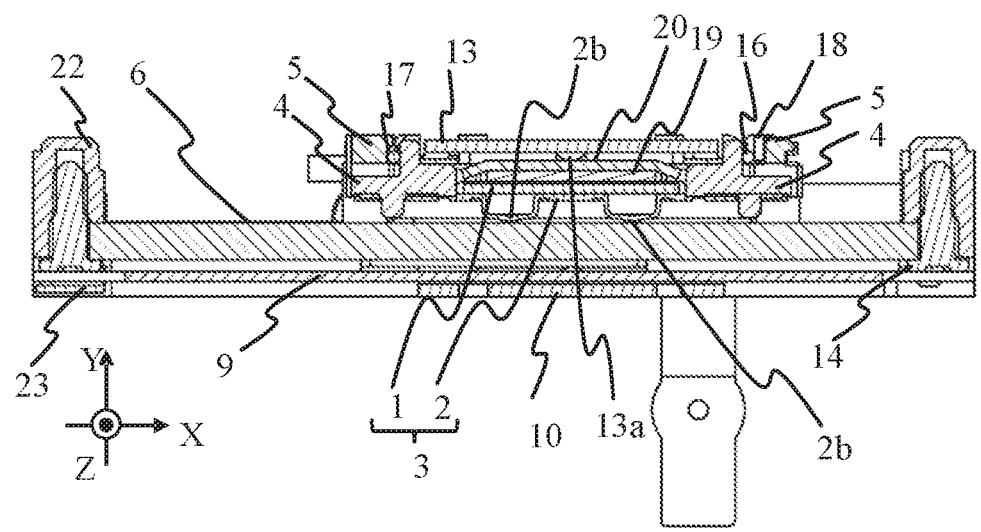
FIG. 4 is a sectional view taken along a line A-A in FIG. 3.
Figure 5:
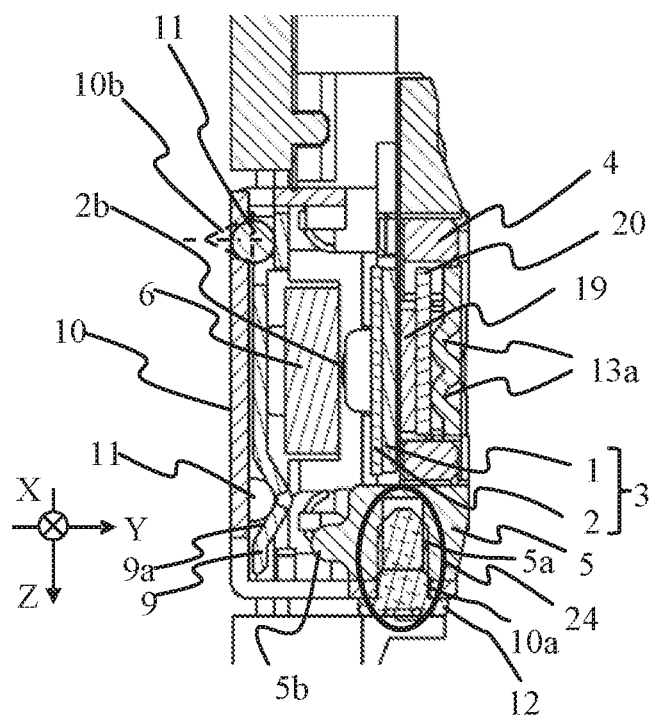
FIG. 5 is a sectional view taken along a line B-B in FIG. 3.

FIGS. 1 to 3 illustrate a perspective view, exploded perspective views, and a top view of a vibration-wave motor 100 according to this embodiment. FIG. 2A is an exploded perspective view viewed from a top surface side. FIG. 2B is an exploded perspective view viewed from a bottom surface side. FIGS. 4 and 5 are sectional views taken along lines A-A and B-B in FIG. 3, respectively.

The vibration-wave motor 100 is a linear actuator of a direct-acting type, and can drive an unillustrated driven member in the X-axis direction by generating a driving force in the X-axis direction.

A description will now be given of a mechanism with which the vibration-wave motor 100 generates the driving force. As illustrated in FIGS. 2A and 2B, the vibration-wave motor 100 includes a vibrator 3 that includes a piezoelectric element 1 and a vibration plate (elastic plate) 2 adhered to each other by the adhesive agent, etc. A flexible substrate 15 is mechanically and electrically connected to the piezoelectric element 1 by anisotropic conductive paste etc., and applies a two-phase high frequency voltage to the piezoelectric element 1. The piezoelectric element 1 generates a periodic vibration in an ultrasonic range when a high frequency voltage is applied to the piezoelectric element 1. At this time, the vibration plate 2 resonates in each of a length direction (X-axis direction) and a width direction (Y-axis direction), and two convexex 2b provided to the vibration plate 2 elliptically move on the xy plane. A rotating direction of the ellipse and the ellipse ratio and a desired motion can be generated by changing a frequency and a phase of a high frequency voltage applied to the piezoelectric element 1.

Due to the above configuration, the vibrator 3 can frictionally contact a slider (contacting member) 6 and generate a relatively moving driving force relative to the slider 6. In other words, the vibrator 3 can move relatively to the slider 6 along the X-axis.

Next follows a description of connections among the vibrator 3, a base 4, and a base holding frame 5. The frame-shaped base (first holding member) 4 holds the vibrator 3. The vibration plate 2 has a hole 2a at a position opposite to a projection 4a formed in the base 4. After the projection 4a is inserted into the hole 2a, the vibration plate 2 is fixed through adhesion etc. The frame-shaped base holding frame (second holding member) 5 has a screw hole 5a coupled with the movable plate, and a driving force transmitting part 5b configured to transmit a driving force generated in the vibrator 3 to the unillustrated driven member.

As illustrated in FIG. 4, roller members 16 and 17 are arranged between the base 4 and the base holding frame 5. The base 4 is disposed inside of each roller member (on the central side of the vibration-wave motor 100) and the base holding frame 5 is disposed outside of each roller member. A flat spring 18 is fixed onto the base holding frame 5 through adhesion etc., and forces the roller member 16 towards the X-axis direction. When the roller member 16 forced by the flat spring 18 forces the base 4 towards the X-axis direction, the base 4 is forced against the base holding frame 5 via the roller member 17. In other words, the base 4 is forced in the X-axis direction relative to the base holding frame 5 via the roller members 16 and 17 and the flat spring 18. In addition, the base 4 can move along the Y-axis as the roller members 16 and 17 roll.

As described above, the vibrator 3 is held by the base 4, and the base 4 is held onto the base holding frame 5 via the roller members 16 and 17 and the flat spring 18. This configuration can realize a connection between the base 4 and the base holding frame 5 which prevents looseness in the X-axis direction and restrains the sliding resistance in the Y-axis direction.

Next follows a description of a compression configuration in which the vibrator 3 frictionally contacts the slider 6. When one pressing member presses the vibrator 3 against the slider 6, it is necessary to dispose the pressing member above the vibrator 3. In this case, a thickness increases in the pressing direction on the vibration-wave motor 100.

Accordingly, this embodiment uses a plurality of pressing members arranged around the vibrator 3 and presses the vibrator 3 against the slider 6. More specifically, four tension coil springs (pressing members) 7 are arranged at four corners of a pressing sheet metal 13. When each first end is engaged with the pressing sheet metal 13 and each second end is engaged with a move plate 10, the vibrator 3 is pressed against the slider 6. The pressing sheet metal 13 projects to the Y-axis direction as the forcing direction (pressing direction) of the four tension coil springs 7, as illustrated in FIGS. 4 and 5, and includes a convex 13a that contacts the plate member 20. A flexible felt 19 is disposed between the vibrator 3 and the plate member 20. The two convexes 2b of the vibrating plate 2 contact the slider 6. The slider 6 is fixed onto a base member 22 by a screw 14. A ball base 9 is disposed opposite to the vibrator 3 with respect to the slider 6. Three balls (roll members) 11 are disposed between the ball base 9 and the move plate (movable member) 10.

As described above, this embodiment can miniaturize the vibration-wave motor 100 so as to bring the vibrator 3 into frictional contact with the slider 6 using the four tension coil springs 7 arranged around the vibrator 3. The forces of the four tension coil springs 7 transmitted to the plate member 20 from the convex 13a in the pressing sheet metal 13 are transmitted to vibrator 3 via a felt 19. Hence, the surface of the vibrator 3 can be pressed with a generally uniform force without impeding the driving vibration of the vibration plate 2 when the driving force is generated.

Next follows a description of the linear guide part (first guide member) 8. The linear guide part 8 includes a ball base 9, a move plate 10, and three balls 11, and guides a movement of the vibrator 3 in the X-axis direction relative to the slider 6 while forcing the vibrator 3 against the slider 6 with the forces of the tension coil springs 7.

The ball base 9 is fixed onto ae base member 22 by a screw 21 via a pressing sheet metal 23. A V-shaped groove that extends in the X-axis direction is formed in at least one of the ball base 9 and the move plate 10 so as to roll the three balls 11 between the ball base 9 and the move plate 10. In this embodiment, the ball base 9 has two V-shaped grooves 9a, and the move plate 10 has three V-shaped grooves 10b. Hence, the tension coil springs 7 press the vibrator 3 against the slider 6, and force the move plate 10 against the ball base 9 via the three balls 11. When the vibrator 3 generates a driving force in the X-axis direction, the three balls 11 roll along the V-shaped grooves 9a and 10b and the move plate 10 is smoothly guided along the X-axis.

Next follows a fixation of the base holding member 5 and the move plate 10. The base holding member 5 and the move plate 10 are coupled with each other via a fixing part (coupling part) 24 provided to one of areas outside of the vibrator 3 in the Z-axis direction where the vibration-wave motor 100 is viewed from the Y-axis direction (pressing direction). Therefore, the vibrator 3, the base 4, the base holding frame 5, and the move plate 10 can integrally move along the X-axis. The move plate 10 at a position overlapping the slider 6 in the Y-axis direction is thin and less rigid than the periphery of the fixing part 24 due to the low profile. In this embodiment, the fixing part 24 perforates through the hole 10a formed in the move plate 10, the screw hole 5b formed in the base holding frame, and the hole 10a, and includes a screw (fastening member) 12 fastened with the screw hole 5a. Instead of this configuration, the fixing part 24 may include a first adhesive part formed on the move plate 10, a second adhesive part formed on the base holding frame, and an adhesive agent, or may use another fixing method.

In the vibration-wave motor 100, when the slider 6 is set to the fixing part, the vibrator 3 serves as a movable part. The movable part includes the base movable part 5 (first movable part) and the move plate 10 (second movable part). When the movable part moves, the driving force transmitting part 5b may have a configuration that does not cause a positional shift (so-called mechanical delay) relative to the vibrator 3 (in particular in the X-axis direction as the moving direction).

The movable part is divided into two on the base holding frame 5 side and on the move plate 10 side so as to sandwich the slider 6 in the Y-axis direction, but the base holding frame 5 and the move plate 10 are fixed by the screw 12. In other words, the fixing part 24 is highly rigid. In addition, the movable part has a natural vibration mode, and when the vibration having a frequency of a natural vibration mode is excited by the external force etc., the movable part resonates and the low rigid spot deforms. Moreover, the driving force transmitting part 5b that transmits the driving force to the driven part may be deformed by a force from the coupled driven member when the driving force transmitting part 5b is disposed at a low rigid position.

Accordingly, in this embodiment, the driving force transmitting part 5b is provided near the fixing part 24 that is provided to one of areas outside of the vibrator 3 in the Z-axis direction when the vibration-wave motor 100 is viewed from the Y-axis direction (pressing direction). More specifically, the driving force transmitting part 5b is provided adjacent to the fixing part 24 so that at least part of the driving force transmitting part 5b overlaps the fixing part 24 in the Y-axis direction as the pressing direction. At least part of the driving force transmitting part 5b is positioned on the plane orthogonal to the X-axis direction in which the fixing part 24 is positioned. Hence, the driving force transmitting part 5b is less subject to the natural vibration of the movable part and the force from the driven part, when the driving force transmitting part 5b is provided near the highly rigid fixing part 24. In other words, since the positional shift of the driving force transmitting part 5b relative to the vibrator 3 in the X-axis direction can be restrained, the driving force transmitting part 5b can stably transmit the driving force to the driven member. As a result, the controllability of the driven member improves.

As described above, this embodiment arranges the four tension coil springs 7 at the four corners of the vibrator 3 so as to make small the vibration-wave motor 100 in the Y-axis direction as the pressing direction. In this configuration, in the movable part divided so as to sandwich the slider 6, the driving force transmitting part 5b is provided near the highly rigid fixing part 24.

This embodiment can restrain the positional shift of the driving force transmitting part 5b relative to the vibrator 3 in the X-axis direction due to the influence of the natural vibration of the movable part and the force from the driven member. Therefore, the driving force transmitting part 5b can stably transmit the driving force to the driven member.

As described above, the vibration-wave motor 100 according to this embodiment can be smaller in the pressing direction relative to the vibrator 3 and stably transmit the driving force without any mechanical delays.

Second Embodiment

Figure 6:
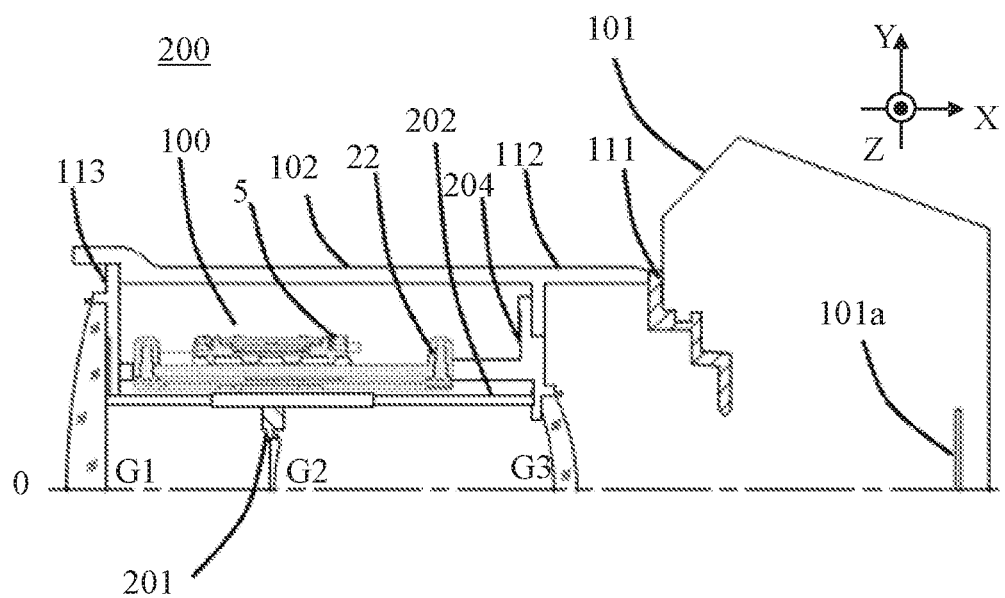
FIG. 6 is a sectional view of a principal part of an image pickup apparatus according to a second embodiment.

FIG. 6 is a sectional view of a principal part of an image pickup apparatus (optical apparatus) 200 that includes a vibration-wave motor 100 according to the first embodiment. The image pickup apparatus 200 includes a camera body 101 that includes an image pickup element 101a, and a lens barrel 102 detachably attached to the camera boy 101 via a mount 111. The lens barrel 102 has an approximately rotationally symmetrical shape, and FIG. 6 illustrates only its upper half. A description of the same configuration as that in the first embodiment will be omitted.

The lens barrel 102 includes an outer cylinder 112 fixed onto the mount 111 by an (unillustrated) screw. The outer cylinder 112 includes a front barrel 113 configured to hold a lens G1 and a back barrel (fixing cylinder) 204 configured to hold a and a lens G3. The back barrel 204 is fixed onto an unillustrated flange part of a base member 22 of the vibration-wave motor 100 by a screw etc. A guide bar 202 is held by the front barrel 113 and the back barrel 204. A focus lens holding frame (referred to as a "lens holding frame" hereinafter) 201 configured to hold the lens G2 is held by a guide bar 202 so as to linearly move along the optical axis O by the vibration-wave 100. The following description describes a lens driving apparatus in which the vibration-wave motor 100 drives the lens holding frame 201 as a driven member.

While vibration-wave 100 is mounted on the image pickup apparatus in this embodiment, the present invention is not limited to this embodiment. The vibration-wave motor 100 may be mounted onto another optical apparatus, such as a lens unit, or an apparatus different from the optical apparatus. In addition, the lens barrel 102 is detachably attached to the camera body 101 in this embodiment, but the present invention is not limited to this embodiment. The lens barrel 102 may be integrated with the camera body 101. In other words, the apparatus according to the present invention may include the vibration-wave motor 100 and a member (driven member) driven by a driving force from the vibration-wave motor 100. In this embodiment, the vibration-wave motor 100 is used to move the lens holding frame as the driven member along the along the optical axis O, but may be used, for example, to move the lens holding frame including the image stabilization lens along a direction orthogonal to the optical axis O.

Figure 7:
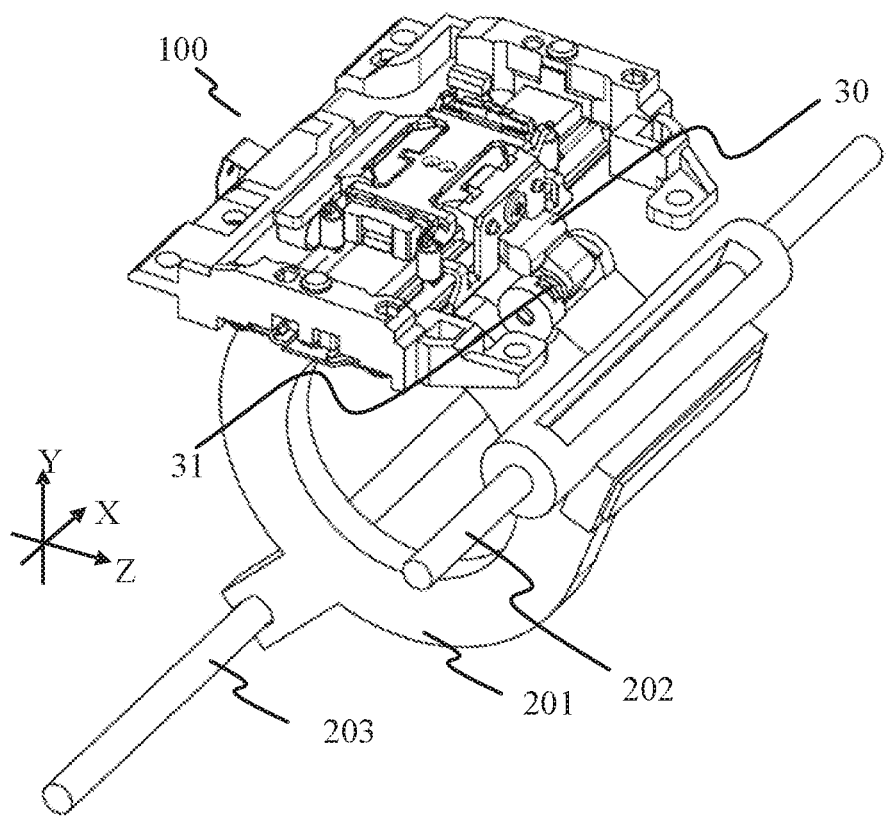
FIG. 7 is a perspective view of a lens driving apparatus according to the second embodiment.

FIG. 7 is a perspective view of the lens driving apparatus. The guide bars 202 and 203 as second guide parts are fixed onto the back barrel 204. A coupling member 30 is rotatably attached to the lens holding frame 201, and forced against the driving force transmitting part 5b by the forcing member 31.

Figure 8:
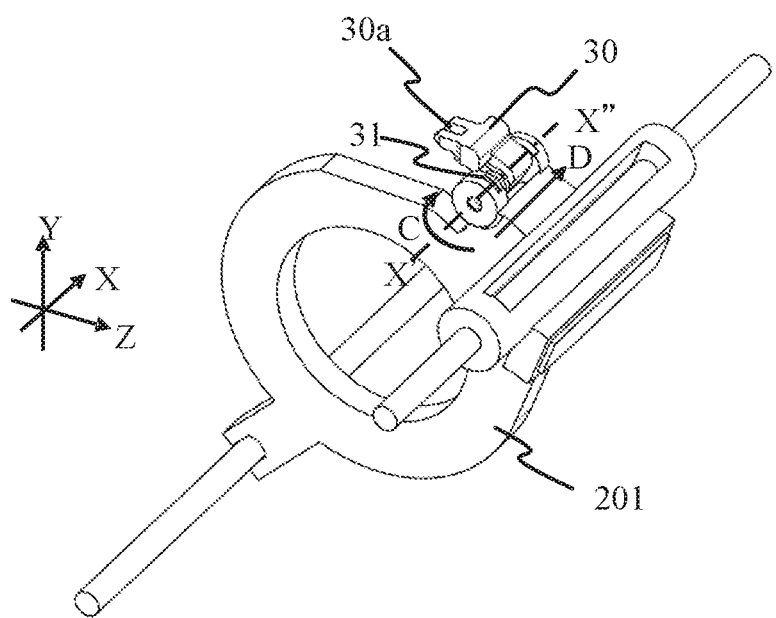
FIG. 8 is a perspective view of the lens driving apparatus where a vibration-wave motor according to the second embodiment is not attached.
Figure 9:
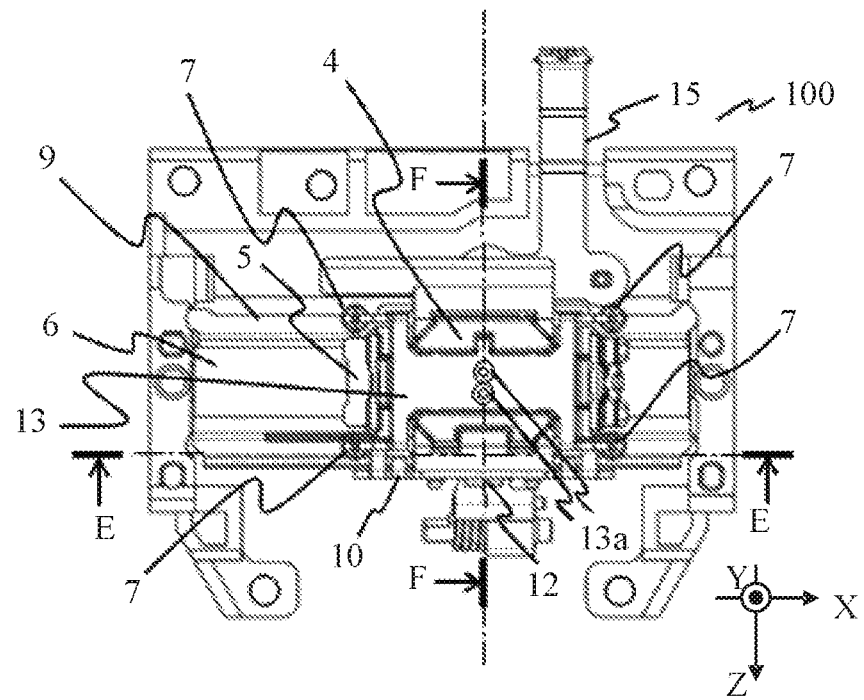
FIG. 9 is a top view of a principal part of the vibration-wave motor according to the second embodiment.
Figure 10:
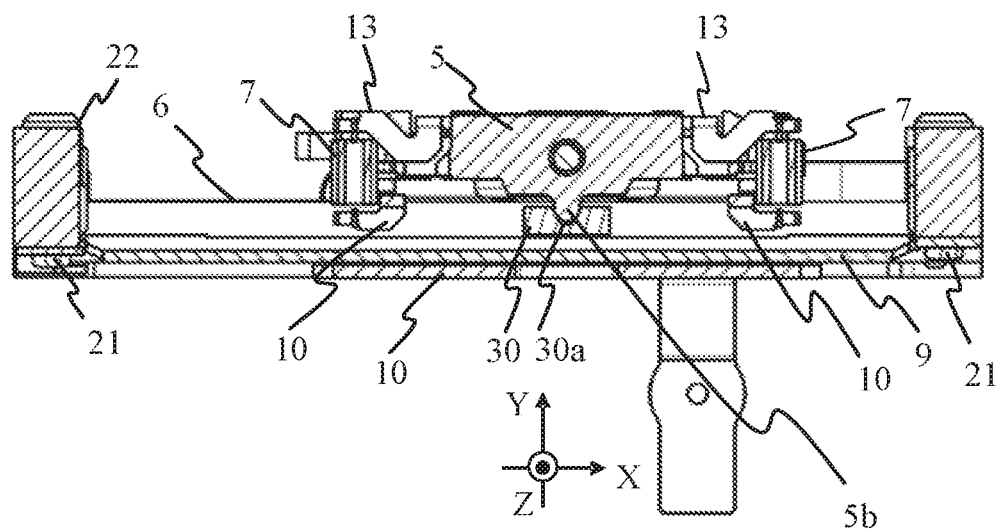
FIG. 10 is a sectional view taken along a line E-E in FIG. 9.
Figure 11:
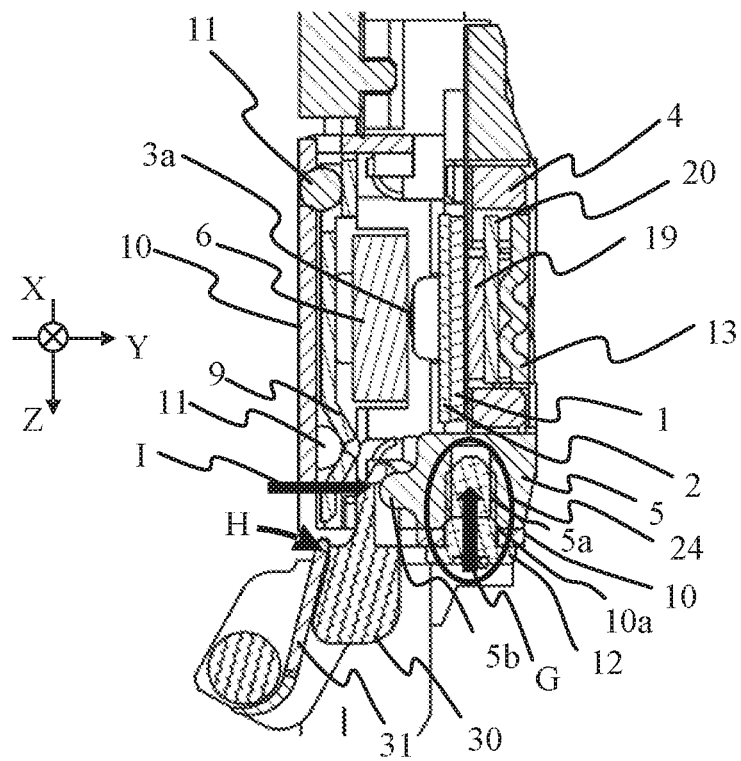
FIG. 11 is a sectional view taken along a line F-F in FIG. 9.

Referring now to FIGS. 8 and 11, a description will be given of the coupling member 30 and the direction in which the coupling member 30 is forced. FIG. 8 is a perspective view of the lens driving apparatus when the vibration-wave motor 100 is not attached. FIG. 9 is a top view of a principal part of the lens driving apparatus. FIGS. 10 and 11 are sectional views taken along lines E-E and F-F in FIG. 9, respectively.

The coupling member 30 includes a V-shaped concave 30a that extends along the Z-axis, which is coupled with the driving force transmitting part 5b. The forcing member 31 forces the coupling member 30 against the lens holding frame 201 in an arrow C direction (or a direction around X'-X" axis parallel to the X-axis) and an arrow D direction (or a direction parallel to the X'-X" axis). The driving force transmitting part 5b has a convex shape with a curved surface engaged with the concave 30a, as illustrated in FIG. 10. When the coupling member 30 is forced by the forcing member 31, the driving force transmitting part 5b is engaged with the concave 30a at two spots. Hence, the lens holding frame 201 is steadily held by the base holding frame 5 via the coupling member 30.

When this configuration drives the movable part that includes the base holding frame 5 in the vibration-wave motor 100, the driving force of the vibration-wave motor 100 is transmitted to the lens holding frame 201 via the driving force transmitting part 5b and the coupling member 30. The lens holding frame 201 is linearly moved along the guide bars 202 and 203 by the driving force of the vibration-wave motor 100.

As illustrated in FIG. 11, the base holding frame 5 and the move plate 10 are coupled by the fixing part 24. The base holding frame 5 and the move plate 10 are fixed when the screw 12 is fastened in an arrow G direction in this embodiment. The coupling member 30 forces the driving force transmitting part 5b in an arrow I direction due to the force of the forcing part 31 illustrated by the arrow H. The arrow G direction as a fastening direction of the screw 12 is approximately orthogonal to the arrow I direction as the forcing direction of the coupling member 30 and the X-axis direction as the relative moving direction between the vibrator 3 and the slider 6.

In the fixing part 24, the base holding frame 5 and the screw 12 are firmly fixed together through the engagement in the screw groove, and the move plate 10 and the screw 12 are frictionally held around the screwhead of the screw 12 and thus the rigidity improves in the Y-axis direction and the Z-axis direction. Since the arrow I direction as the forcing direction of the coupling member 30 is approximately equal to the Y-axis direction in which the fixing part 24 is highly rigid, the force of the coupling member 30 can restrain the positional shift of the driving force transmitting part 5b in the X-axis direction.

As described above, the image pickup apparatus 200 according to this embodiment accords with the direction in which the fixing part 24 is highly rigid the forcing direction to the driving force transmitting part 5b of the coupling member 30 that couples the driving force transmitting part 5b in the vibration-wave motor 100 with the lens holding frame 201 as the driven part.

Thereby, this embodiment can restrain the influence of the natural vibration of the movable part and the force from the coupling member 30 on the driving force transmitting part 5b when the vibration-wave motor 100 is driven. In other words, since the vibration-wave motor 100 can stably transmit the driving force to the lens holding frame 201 via the coupling member 30, the positioning precision of the lens holding frame 201 can be improved.

As described above, this embodiment can provide an apparatus that is small in a direction pressing the vibrator and includes a vibration-wave motor that can transmit a driving force without mechanical delays.

Third Embodiment

This embodiment discusses a lens driving apparatus 400 in which a driven member is driven by a vibration-wave motor 300 having a structure different from that of the vibration-wave motor 100 according to the first embodiment. The vibration-wave motor 300 has the same basic configuration as that of the vibration-wave motor 100 but has a different configuration of the fixing part for coupling the base holding frame and the move plate with each other. A description of the same configuration as that of the vibration-wave motor 100 will be omitted.

Figure 12:
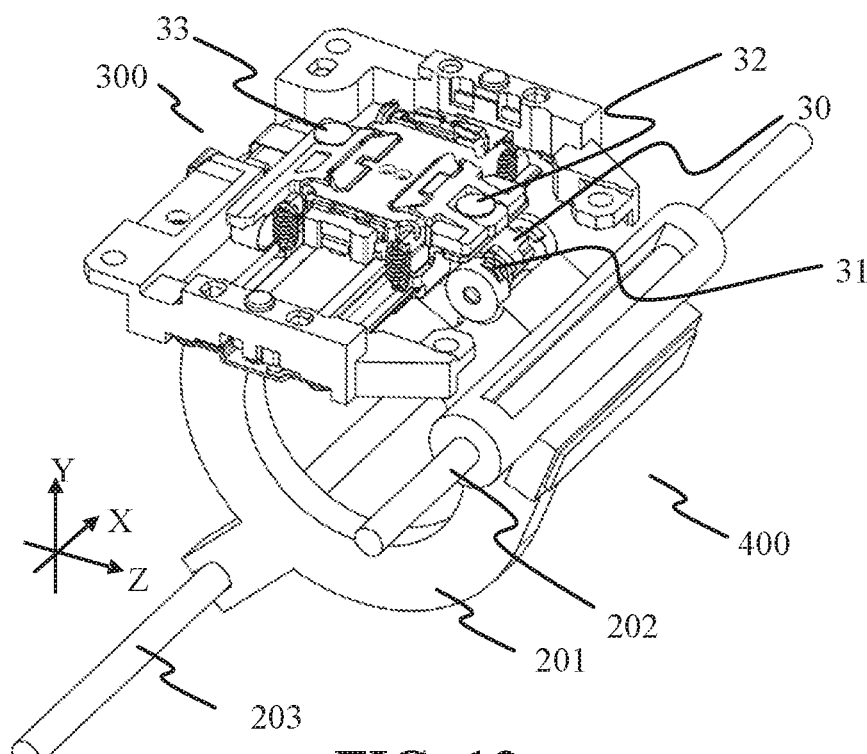
FIG. 12 is a perspective view of a lens driving apparatus according to a third embodiment.
Figure 13:
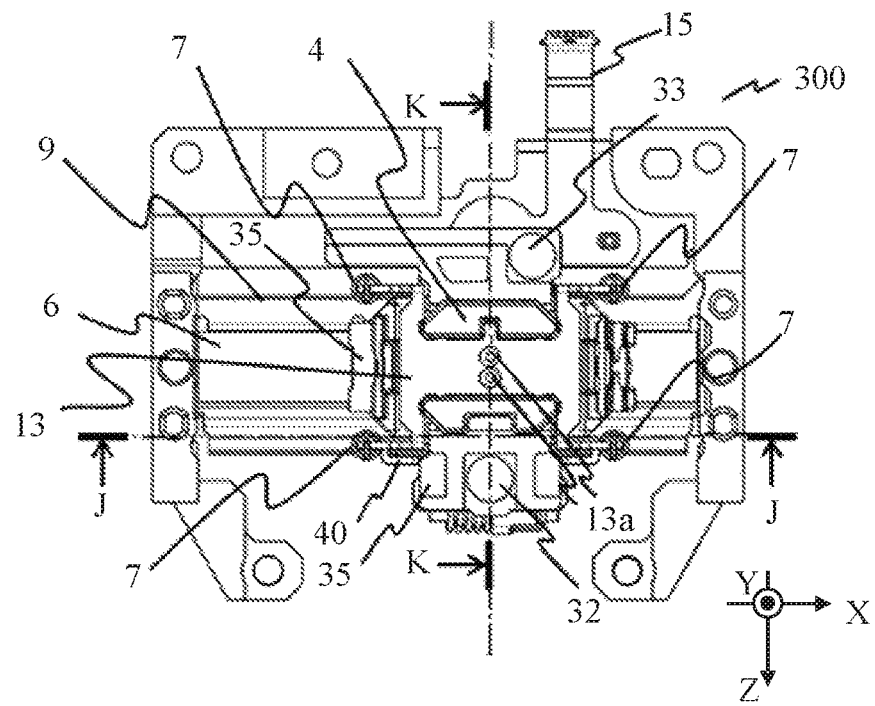
FIG. 13 is a top view of a principal part of the lens driving apparatus according to the third embodiment.
Figure 14:
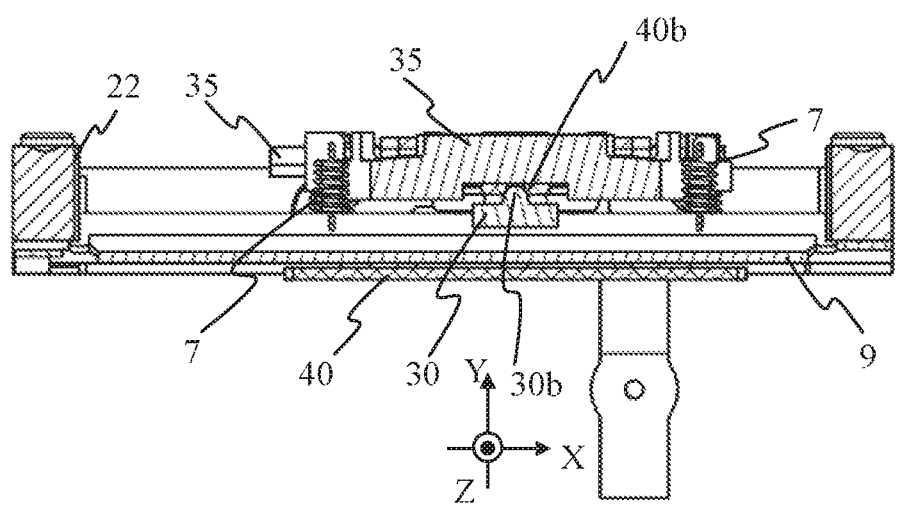
FIG. 14 is a sectional view taken along a line J-J in FIG. 13.
Figure 15:
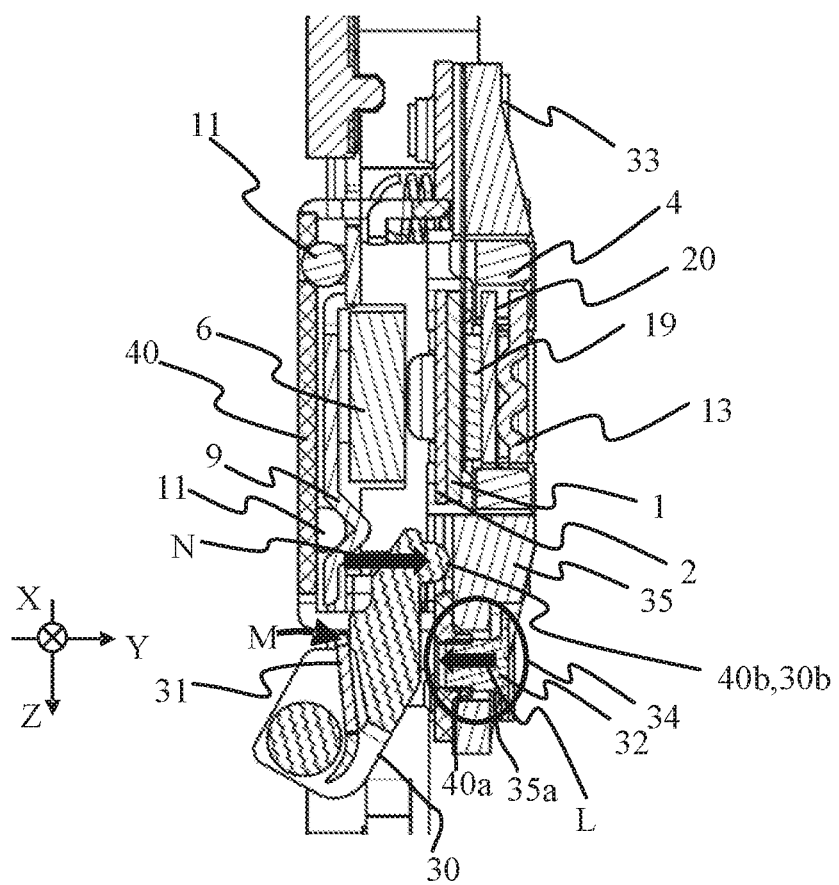
FIG. 15 is a sectional view taken along a line K-K in FIG. 13.

FIG. 12 is a perspective view of a lens driving apparatus 400. FIG. 13 is a top view of a principal part of the lens driving apparatus 400. FIGS. 14 and 15 are sectional views taken along lines J-J and K-K in FIG. 13, respectively.

In the vibration-wave motor 300, a base holding frame (second holding member) 35 does not have a driving force transmitting part, but a move plate (movable member) 40 includes a driving force transmitting part 40b. The driving force transmitting part 40b is a V-shaped groove that extends along the Z-axis. The coupling member 30 has a convex 30b having a curved surface engaged with the driving force transmitting part 40b. When the coupling member 30 is forced by the forcing member 31, the driving force transmitting part 40b is engaged with the convex 30b at two spots. Hence, the lens holding frame 201 is steadily held relative to the move plate 40 via the coupling member 30.

As illustrated in FIG. 15, the base holding frame 35 and the move plate 40 are coupled with each other by a fixing part (coupling part) 34 provided at one of areas outside of the vibrator 3 in the Z-axis direction when the vibration-wave motor 100 is viewed from the Y-axis direction (pressing direction). In this embodiment, the fixing part 34 perforates through a hole 35a formed in the base holding frame 35, a screw hole 40a formed in the move plate 40, and the hole 35a, and includes a screw (fastening member) 32 fastened with the screw hole 40a. In other words, in this embodiment, the base holding frame 35 and the move plate 40 are fixed when the screw 32 is fastened in an arrow L direction. The coupling member 30 forces the driving force transmitting part 40b in an arrow N direction due to the force from the forcing member 31 illustrated by the arrow M. The arrow L direction as the fastening direction of the screw 32 is approximately the same as the arrow N direction as the forcing direction of the coupling member 30.

In the fixing part 34, the move plate 40 and the screw 32 are firmly fixed together through the engagement in the screw groove, and the base holding frame 35 and the screw 32 are frictionally held around the screwhead of the screw 32 and thus the rigidity improves in the Y-axis direction and the Z-axis direction. Since the driving force transmitting part 40b may be provided near the highly rigid fixing part 34, this embodiment provides the vibration-wave motor 300 near the fixing part 34 provided to one of the areas outside of the vibrator 3 in the Z-axis direction when the vibration-wave motor 100 is viewed from the Y-axis direction (pressing direction). More specifically, the driving force transmitting part 40b is provided adjacent to the fixing part 34 in the Z-axis direction orthogonal to the moving direction and the pressing direction so that at least part of the driving force transmitting part 40b overlaps the fixing part 34. By providing the driving force transmitting part 40b near the highly rigid fixing part 34, the driving force transmitting part 40b is less subject to the natural vibration of the movable part and the force from the driven part. In other words, since the positional shift of the driving force transmitting part 40b relative to the vibrator 3 can be restrained in the X-axis direction, the driving force transmitting part 40b can stably transmit the driving force to the driven part. As a result, the controllability of the driven part improves.

In the fixing part 34, the rigidity of fixture caused by the engagement with the screw groove in the Y-axis direction is higher than the rigidity of the frictional holding around the screwhead of the screw 32. When the forcing direction of the coupling member 30 is approximately accorded with the Y-axis direction in which the fixing part 34 is highly rigid, the rigidity of the movable part can be further improved. This configuration can restrain the positional shift of the driving force transmitting part 40b relative to the vibrator 3 in the X-axis direction due to the force of the coupling member 30.

In addition, this embodiment couples the base holding frame 35 and the move plate 40 with each other using the screw 33 in addition to the screw 32 or double-supports the movable part. The two fixing parts fastened with two screws can change the natural vibration mode in the movable part and improve the rigidity of the movable part. Since the movable part becomes larger in the Z-axis direction by the size of the screw 33 but improves the rigidity, the positional shift of the driving force transmitting part 40b relative to the vibrator 3 can be restrained in the X-axis direction due to the thin profile.

Although only fastening with the screw 32 can improve the rigidity of the movable part and restrain the positional shift of the driving force transmitting part 40b relative to the vibrator 3 in the X-axis direction, the fastening with the screw 33 may be added and the movable part may be double-supported. In addition to the fastening with the screw 32, fastening with another screw may be added to a position adjacent to the screw 32 in the X-axis direction. In this case, positions among the plurality of screw fastening parts are highly rigid.

As described above, the lens driving apparatus 400 according to this embodiment accords with the direction in which the fixing part 34 is highly rigid (or the fastening direction of the screw 32) the forcing direction of the coupling member 30 that couples the driving force transmitting part 40b in the vibration-wave motor 300 with the lens holding frame 201 as the driven part. Moreover, this embodiment couples the base holding frame 35 and the move plate 40 with each other through the screws 32 and 33 sandwiching the slider 6 or double-supports the movable part.

This embodiment can restrain the influence of the natural vibration of the movable part and the force from the coupling member 30 on the driving force transmitting part 40b when the vibration-wave motor 300 is driven. In other words, since the vibration-wave motor 300 can stably transmit the driving force to the lens holding frame 201 via the coupling member 30, the positioning precision of the lens holding frame 201 can be improved.

As described above, this embodiment can provide an apparatus that is small in a direction pressing the vibrator and includes a vibration-wave motor that can transmit a driving force without mechanical delays.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-243180, filed on Dec. 15, 2016, which is hereby incorporated by reference herein in its entirety.

What is claimed is:

1. A vibration-wave motor comprising:
   a vibrator;
   a contacting member configured to contact the vibrator;
   first and second movable parts configured to move relative to the contacting member by vibrating the vibrator;
   a fixing part configured to fix the first movable part and the second movable part;
   a driving force transmitting part disposed to at least one of the first and second movable parts and configured to transmit a driving force from the vibration-wave motor; and
     a pressing mechanism that includes a plurality of elastic members and a transmitting member configured to transmit a force from the plurality of elastic members to the vibrator, and presses the vibrator against the contacting member,
     wherein one end of the plurality of elastic members is held by the transmitting member, and another end of the plurality of elastic members is held by one of the first and second members,
   wherein the contacting member is disposed between the first and second movable parts in a first direction orthogonal to moving directions of the first and second movable parts, and
   wherein the driving force transmitting part is provided near the fixing part.

2. A vibration-wave motor comprising:
   a vibrator;
   a contacting member configured to contact the vibrator;
   first and second movable parts configured to move relative to the contacting member by vibrating the vibrator;
   a fixing part configured to fix the first movable part and the second movable part;
   a driving force transmitting part disposed to at least one of the first and second movable parts and configured to transmit a driving force from the vibration-wave motor; and
     a pressing mechanism that includes a plurality of elastic members and a transmitting member configured to transmit a force from the plurality of elastic members to the vibrator, and presses the vibrator against the contacting member,
     wherein one end of the plurality of elastic members is held by the transmitting member, and another end of the plurality of elastic members is held by one of the first and second members,
   wherein the contacting member is disposed between the first and second movable parts in a first direction orthogonal to moving directions of the first and second movable parts, and
   wherein the fixing part and the driving force transmitting part are provided in one of areas outside of the vibrator in a second direction orthogonal to the moving direction and the first direction.

3. The vibration-wave motor according to claim 2, wherein at least part of the driving force transmitting part is disposed on a plane orthogonal to the moving direction on which the fixing part is disposed.

4. The vibration-wave motor according to claim 3, wherein the fixing part has holes provided in the first and second movable parts and a fastening member configured to fix the first movable part onto the second movable part using the holes.

5. The vibration-wave motor according to claim 4, wherein a fastening direction of the fastening member is approximately parallel to the second direction.

6. The vibration-wave motor according to claim 4, wherein a fastening direction of the fastening member is approximately parallel to the first direction.

7. The vibration-wave motor according to claim 2, wherein the driving force transmitting part has a curved shape projecting in the first direction.

8. The vibration-wave motor according to claim 2, wherein the driving force transmitting part is a groove that extends in the second direction.

9. The vibration-wave motor according to claim 2, wherein the first movable part holds the vibrator, and the second movable part holds a guide part configured to guide a movement of the first and second movable parts.

10. A vibration-wave motor comprising:
    a vibrator;
    a contacting member configured to contact the vibrator;
    first and second movable parts configured to move relative to the contacting member by vibrating the vibrator;

a fixing part configured to fix the first movable part and the second movable part;

a driving force transmitting part disposed to at least one of the first and second movable parts and configured to transmit a driving force from the vibration-wave motor; and a pressing mechanism that includes a plurality of elastic members and a transmitting member configured to transmit a force from the plurality of elastic members to the vibrator, and presses the vibrator against the contacting member, wherein one end of the plurality of elastic members is held by the transmitting member, and another end of the plurality of elastic members is held by one of the first and second members, wherein the contacting member is disposed between the first and second movable parts in a first direction orthogonal to moving directions of the first and second movable parts, and wherein the driving force transmitting part is provided at a position that provides a rigidity higher than those of the first and second movable parts at position overlapping the contacting member in the first direction.

11. An apparatus comprising:
a vibration-wave motor; and
a driven member driven by a driving force transmitted by the vibration-wave motor,
wherein the vibration-wave motor includes:
a vibrator;
a contacting member configured to contact the vibrator;
first and second movable parts configured to move relative to the contacting member by vibrating the vibrator;
a fixing part configured to fix the first movable part and the second movable part;
a driving force transmitting part disposed to at least one of the first and second movable parts and configured to transmit a driving force from the vibration-wave motor; and a pressing mechanism that includes a plurality of elastic members and a transmitting member configured to transmit a force from the plurality of elastic members to the vibrator, and presses the vibrator against the contacting member, wherein one end of the plurality of elastic members is held by the transmitting member, and another end of the plurality of elastic members is held by one of the first and second members, wherein the contacting member is disposed between the first and second movable parts in a first direction orthogonal to moving directions of the first and second movable parts, and wherein the driving force transmitting part is provided near the fixing part.

12. The apparatus according to claim 11, wherein the apparatus is an optical apparatus that includes a lens as the driven member, wherein the driving force transmitting part transmits the driving force to the lens.

13. The apparatus according to claim 11, wherein the apparatus is an image pickup apparatus.

14. An apparatus comprising:
a vibration-wave motor; and
a driven member driven by a driving force transmitted by the vibration-wave motor,
wherein the vibration-wave motor includes:
a vibrator;
a contacting member configured to contact the vibrator;
first and second movable parts configured to move relative to the contacting member by vibrating the vibrator;
a fixing part configured to fix the first movable part and the second movable part;
a driving force transmitting part disposed to at least one of the first and second movable parts and configured to transmit a driving force from the vibration-wave motor; and a pressing mechanism that includes a plurality of elastic members and a transmitting member configured to transmit a force from the plurality of elastic members to the vibrator, and presses the vibrator against the contacting member, wherein one end of the plurality of elastic members is held by the transmitting member, and another end of the plurality of elastic members is held by one of the first and second members, wherein the contacting member is disposed between the first and second movable parts in a first direction orthogonal to moving directions of the first and second movable parts, and wherein the fixing part and the driving force transmitting part are provided in one of areas outside of the vibrator in a second direction orthogonal to the moving direction and the first direction.

15. The apparatus according to claim 14, wherein the apparatus is an optical apparatus that includes a lens as the driven member, wherein the driving force transmitting part transmits the driving force to the lens.

16. The apparatus according to claim 14, wherein the apparatus is an image pickup apparatus.

17. An apparatus comprising:
a vibration-wave motor; and
a driven member driven by a driving force transmitted by the vibration-wave motor,
wherein the vibration-wave motor includes:
a vibrator;
a contacting member configured to contact the vibrator;
first and second movable parts configured to move relative to the contacting member by vibrating the vibrator;
a fixing part configured to fix the first movable part and the second movable part;
a driving force transmitting part disposed to at least one of the first and second movable parts and configured to transmit a driving force from the vibration-wave motor; and a pressing mechanism that includes a plurality of elastic members and a transmitting member configured to transmit a force from the plurality of elastic members to the vibrator, and presses the vibrator against the contacting member, wherein one end of the plurality of elastic members is held by the transmitting member, and another end of the plurality of elastic members is held by one of the first and second members, wherein the contacting member is disposed between the first and second movable parts in a first direction orthogonal to moving directions of the first and second movable parts, and wherein the driving force transmitting part is provided at a position that provides a rigidity higher than those of the first and second movable parts at position overlapping the contacting member in the first direction.

18. The apparatus according to claim 17, wherein the apparatus is an optical apparatus that includes a lens as the driven member, wherein the driving force transmitting part transmits the driving force to the lens.

19. The apparatus according to claim 17, wherein the apparatus is an image pickup apparatus.

\* \* \* \* \*